United States Patent
VanStralen et al.

(10) Patent No.: US 7,340,020 B2
(45) Date of Patent: *Mar. 4, 2008

(54) METHOD AND APPARATUS FOR TRACKING INVALID SIGNALS THROUGH A DIGITAL SYSTEM

(75) Inventors: Nick A. VanStralen, Ballston Lake, NY (US); Kenneth B. Welles, II, Scotia, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,576

(22) Filed: Aug. 28, 2006

(65) Prior Publication Data

US 2006/0285614 A1    Dec. 21, 2006

Related U.S. Application Data

(63) Continuation of application No. 10/035,618, filed on Dec. 28, 2001, now Pat. No. 7,110,482.

(60) Provisional application No. 60/259,121, filed on Dec. 29, 2000.

(51) Int. Cl.
    *H04B 1/10* (2006.01)
(52) U.S. Cl. .................................................. 375/350
(58) Field of Classification Search ........ 375/229–232, 375/236, 285, 346, 348, 350, 296; 708/300–301, 708/322–323
See application file for complete search history.

(56) References Cited

U.S. PATENT DOCUMENTS

| | | |
|---|---|---|
| 3,609,568 A | 9/1971 | Jackson |
| 3,700,874 A | 10/1972 | Heightley |
| 3,725,687 A | 4/1973 | Heightley |
| 3,763,490 A | 10/1973 | Hadley et al. |
| 4,034,197 A | 7/1977 | Lawrence et al. |
| 4,215,415 A | 7/1980 | Kanemasa et al. |
| 4,282,581 A | 8/1981 | Bondurant et al. |
| 4,700,324 A | 10/1987 | Doi et al. |
| 4,722,066 A | 1/1988 | Armer et al. |
| 4,791,390 A | 12/1988 | Harris et al. |
| 4,899,304 A | 2/1990 | Terane et al. |
| 5,103,230 A | 4/1992 | Kalthoff et al. |
| 5,307,375 A | 4/1994 | Wu et al. |
| 5,581,580 A | 12/1996 | Lindbom et al. |
| 5,602,872 A | 2/1997 | Andrews |
| 5,638,439 A | 6/1997 | Kawada et al. |
| 5,937,007 A | 8/1999 | Raghunath |
| 5,959,500 A | 9/1999 | Garrido |
| 5,963,599 A | 10/1999 | Curtis et al. |
| 6,545,535 B2 | 4/2003 | Andre |
| 6,650,701 B1 | 11/2003 | Hsiang et al. |
| 6,693,984 B1 | 2/2004 | Andre |

*Primary Examiner*—Khanh C. Tran
(74) *Attorney, Agent, or Firm*—Ronald E. Prass, Jr.; Prass & Irving, LLP

(57) ABSTRACT

A method, apparatus and system that tracks distorted signals in a digital system is disclosed. The method may include receiving an input signal having a first input value when a distorted signal is input to the digital system and has a second input value when a non-distorted signal is input to the digital system, and outputting a signal having a first output value to indicate that a corresponding output signal from the digital system is distorted and has a second output value to indicate that a corresponding output signal from the digital system is not distorted.

15 Claims, 5 Drawing Sheets

METHOD AND APPARATUS FOR TRACKING INVALID SIGNALS THROUGH A DIGITAL SYSTEM

RELATED APPLICATIONS

This application is a continuation of U.S. patent application Ser. No. 10/035,618, filed Dec. 28, 2001, which claims the priority benefit of U.S. Provisional Application No. 60/259,121, filed on Dec. 29, 2000, which is incorporated herein by reference.

BACKGROUND OF THE INVENTION

1. Field of the Invention

The present invention relates in general to a method and apparatus for tracking distorted signals through a digital system. More particularly, the present invention relates to a method and apparatus for identifying distorted output signals from a digital filter caused by a distorted input signal to the digital filter.

2. Introduction

A distorted signal in a digital system may result because a digital component in the digital system operated beyond its dynamic range due to a multiplication or summation operation in the digital system, for example. Analog-to-digital conversion and digital filtering are common signal processing algorithms performed in a digital system that cause distorted signals in a digital system may result from distorted input signals to the digital system. For example, in digital filters, a single distorted input signal may create a stream of distorted output signals. This occurs because of the widening characteristics of a digital filter due to non-zero filter coefficients of the digital filter. In addition, the effect of a distorted input signal on output signals of a digital filter may be delayed due to the pipelined implementation of the digital filter. That is, if a distorted input signal is input to the digital filter at time $t_1$, then the distorted input signal may cause a distorted output signal from the digital filter at time $t_2$, where $t_2 > t_1$.

Distorted signals may reduce the accuracy of the digital system and generate erroneous data. For example, if a distorted signal in a digital system is used to compute filter weights for a digital filter, the accuracy of the digital system may be reduced. Therefore, it is desirable to track the distorted signals so that their deleterious effects may be reduced by, for example, excluding the distorted signal.

However, conventional tracking devices only identify distorted signals that result from distorted input signals. Accordingly, there is a need for tracking device for identifying distorted signals resulting from distorted input signals.

SUMMARY OF THE INVENTION

A method, apparatus and system that tracks distorted signals in a digital system is disclosed. The method may include receiving an input signal having a first input value when a distorted signal is input to the digital system and has a second input value when a non-distorted signal is input to the digital system, and outputting a signal having a first output value to indicate that a corresponding output signal from the digital system is distorted and has a second output value to indicate that a corresponding output signal from the digital system is not distorted.

Additional advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION OF THE INVENTION

Reference will not be made in detail to the present exemplary embodiments of the invention, examples of which are illustrated in the accompanying drawings. Wherever possible, the same reference numbers will be used throughout the drawings to refer to the same or like parts.

As discussed above, it is desirable to track distorted signals through a digital system. A single distorted input signal to a digital system may create a plurality of distorted output signals. Further as discussed above, these distorted output signals may be delayed from the time the distorted input signal is input to the digital system. To determine which output signals of the digital system are distorted, a tracking circuit operating in parallel with the digital system is provided. Each input signal to the tracking circuit corresponds to an input signal to the digital system. Each output signal from the tracking circuit corresponds to an output signal from the digital system.

Figure 1:
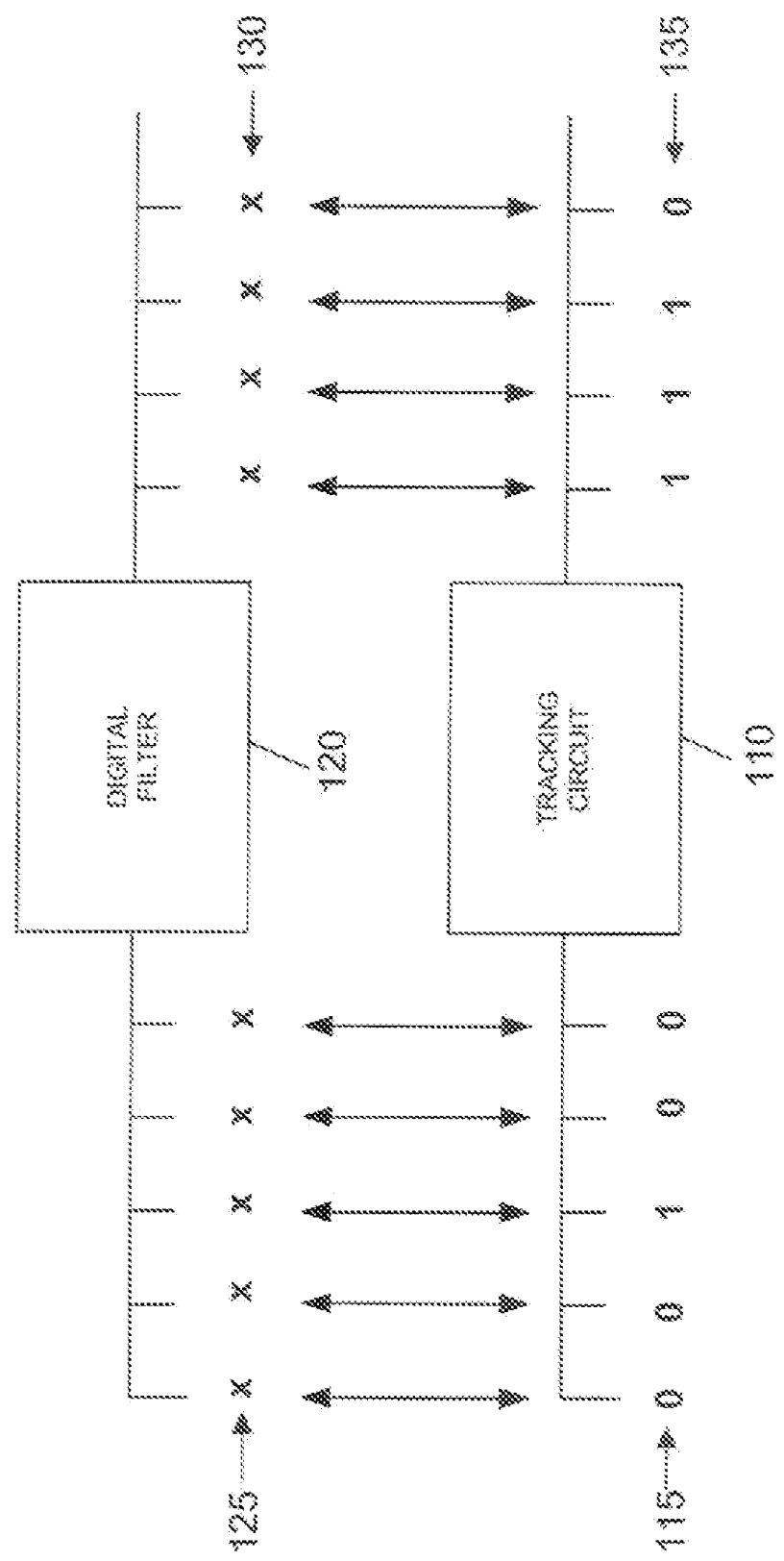
FIG. 1 illustrates an exemplary filter that models a digital filter.

FIG. 1 illustrates an exemplary tracking circuit 110 operating in parallel with a digital filter 120. For each input signal 125 to the digital filter 120, a corresponding high or low signal 125 to the digital filter 120 is distorted. For example, if the input signal 125 to the digital filter 120 is distorted, a high signal (i.e., an input flag) is input to the tracking circuit 110. Otherwise, a low signal is input to the tracking circuit 110. For each output signal 130 from the digital filter 120, a corresponding high or low signal 135 is output from the tracking circuit 110 to indicate whether the output signal 130 from the digital filter 120 is distorted. For example, if the output signal 135 from the tracking circuit 110 is high, then the corresponding output signal 130 from the digital filter 120 is considered distorted. If the output signal 135 from the tracking circuit 110 is low, then the corresponding output signal 130 from the digital filter 110 is considered valid.

Figure 2:
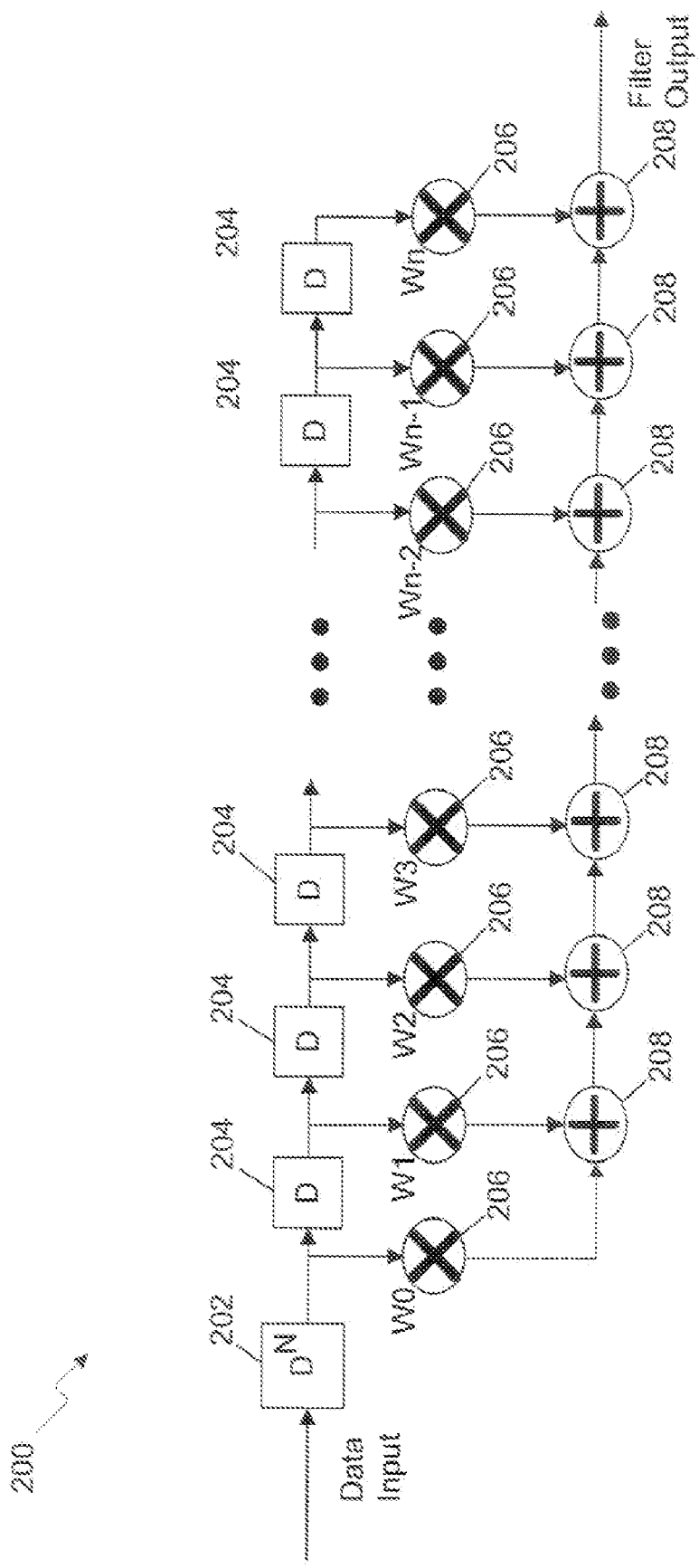
FIG. 2 illustrates a digital filter and tracking circuit operating in parallel.

For the tracking circuit 110 to operate in parallel with the digital filter 120, the tracking circuit 110 may model the delay and widening characteristics of the digital filter 120. FIG. 2 illustrates a filter model 200 that models the operation of a (n+1) coefficient digital filter typically found in a digital processing system. More specifically, the filter model 200 models the delay and widening characteristics of the digital filter. The filter model 200 comprises delay means 202 and 204, multipliers 206, and adders 208.

Delay means 202 delays an input signal for a period of time equivalent to an initial latency period in the digital filer. The initial latency period is the time it takes for the input signal to effect an output signal of the digital filter. Delay means 204 further delays the input signal to form delayed input signals for further processing. The filter model 200 comprises (n+1) multipliers 206 for multiplying the delayed input signals by (n+1) filer coefficients $W_0$, $W_1$, $W_2$, ... $W_{n-1}$, $W_n$, respectively, to form weighted input signals. Adders 208 sum the delayed and weighted input signals to form an output signal.

As discussed above, one or more distorted input signals may cause distortion in a plurality of output signals because of the widening characteristics of the digital filter due to the non-zero filter coefficients. The filter model 200 models the widening of the distorted input signal using delay means 204, multipliers 206, and adders 208. Furthermore, the distorted output signals will be delayed from the time the distorted input signal is input to the digital filter. The filter model 200 models the delay of the distorted output signals using the delay means 102.

Figure 3:
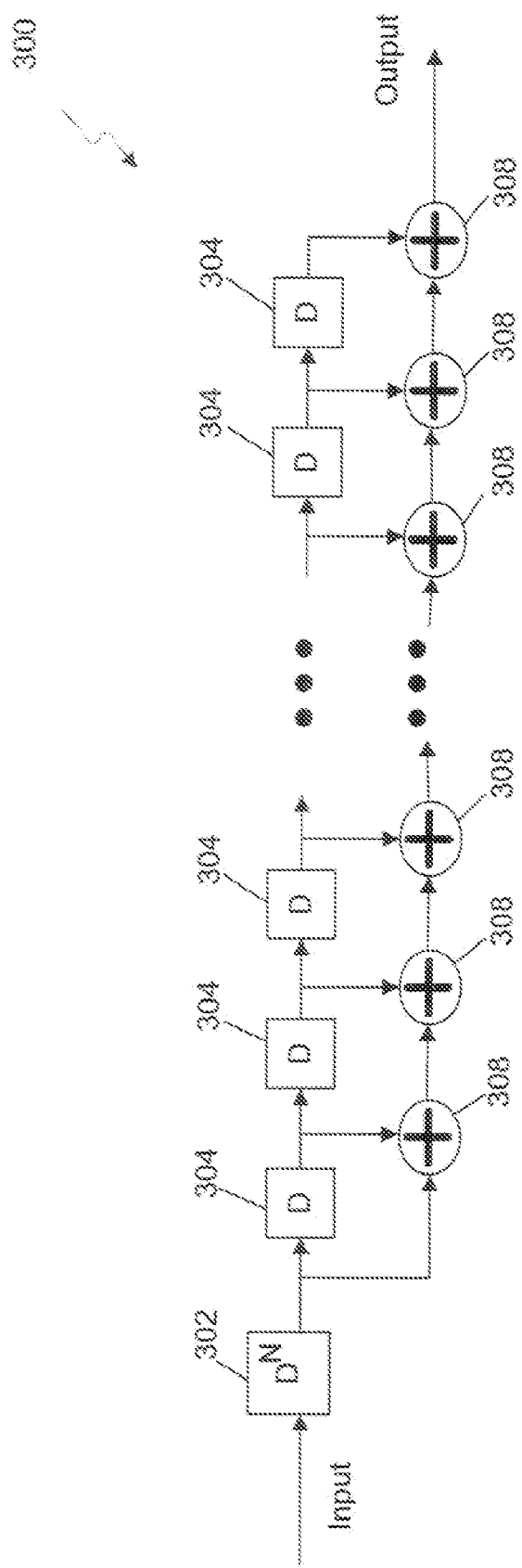
FIG. 3 illustrates an exemplary tracking circuit according to the teachings of the present invention.
Figure 4:
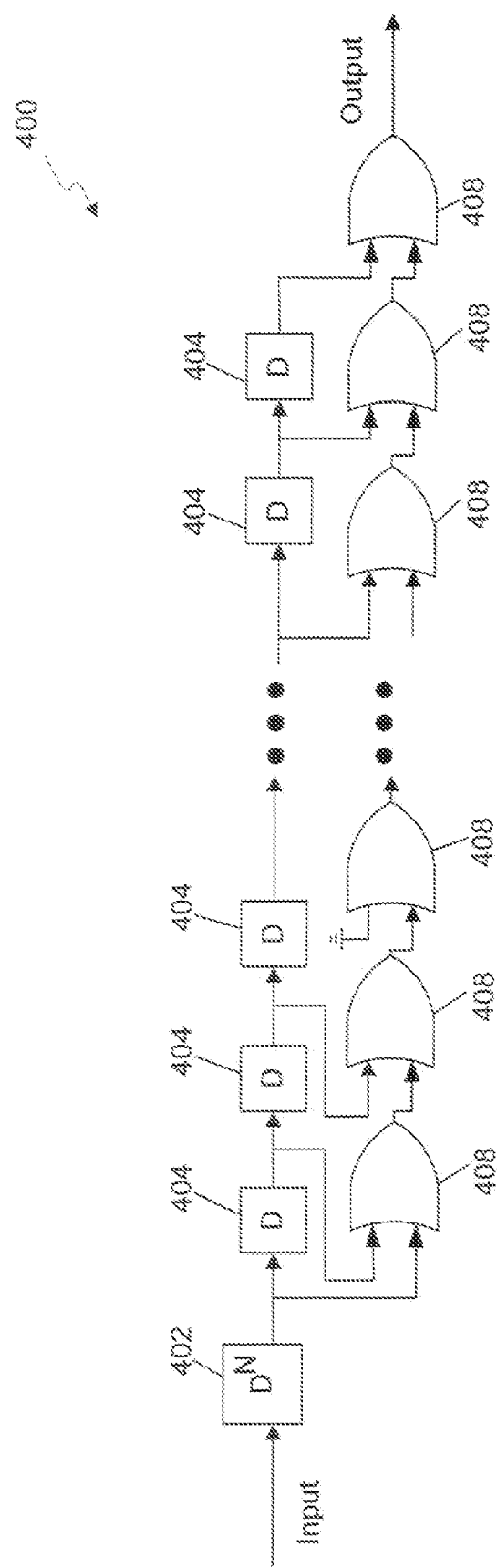
FIG. 4 illustrates an exemplary tracking circuit according to the teachings of the present invention.

Similar to filter model 200, the tracking circuit 300 of FIG. 3 models the delay and widening characteristics of the digital filter. However, the tracking circuit 300 is a simplified version of filter model 200. Tracking circuit 300 comprises delay means 302 and 304 and adders 308. Because a single bit may be used to indicate whether a signal is distorted, the adders 308 may be implemented using two-input OR gates 408, for example, as shown in FIG. 4. Furthermore, because the tracking circuit 300 tracks distorted signals and does not perform digital filtering similar to filter model 200, multipliers are not needed. For each non-zero filter coefficient in the digital filter, the tracking circuit 300 uses a multiplier of one. For each coefficient equal to zero in the digital filter, the tracking circuit 300 grounds an input to a corresponding adder 308. For example, as shown in FIG. 4, for each filter coefficient equal to zero in the digital filter, the tracking circuit 300 grounds an input to a corresponding OR gate.

Tracking circuit 300 of FIG. 3 may be further simplified if the non-zero filter coefficients of the digital filter are contiguous. The non-zero filter coefficients may be contiguous if there are no filter coefficients equal to zero between the first non-zero filter coefficient and the last non-zero filter coefficient. In the case of contiguous non-zero filter coefficients, tracking circuit 500 of FIG. 5 may be used to track distorted input signals. The tracking circuit 500 models the delay of the digital filter using delay means 502. Delay means 502 delays an input signal to the tracking circuit 500 for a time equivalent to an initial latency of the digital filter.

If a distorted signal is in put to a digital filter with contiguous non-zero filter coefficients, the length of the chain of distorted output signals from the digital filter may be equal to the number of non-zero filter coefficients of the digital filter. This widening characteristic of the digital filter may be modeled using a presetable down counter 504 and decision unit 514, for example. The presetable down counter 504 and decision unit 514, for example. The presetable down counter 504 and decision unit 514 model the widening characteristics of the digital filter by creating a chain of high output signals equal in length to the number of non-zero filter coefficients of the digital filter to indicate that the corresponding chain of output signals of the digital filter are distorted.

The tracking circuit 500 may operate as follows. When a distorted signal is input to the digital filter, a high signal is input to the tracking circuit 500 causing the down counter 504, once the high signal reaches the preset input 506, to preset and begin counting down from a preset value. The preset value may be equal to the number of contiguous non-zero filter coefficients, z. The preset value is set using the present value input 508 of the down counter 504. The down counter 504 continues to count down until either the down counter 504 reaches zero or until another high signal is input to the down counter 504 causing it to preset to the preset value. For each output signal from the down counter 504, decision unit 514 determines whether the count value is non-zero. If the count value 510 is non-zero, then decision unit 514 outputs a high signal, indicating the corresponding output signal from the digital filter is distorted. If the count value 510 is zero, decision unit 514 outputs a low signal, indicating the corresponding output signal from the digital filter is valid. When the down counter 504 reaches zero, it remains at zero until a subsequent high signal is input to the down counter 504. It will be obvious to one of ordinary skill in the art the various means of implementing decision unit 514. For example, decision unit 514 may be implemented using one or more logic elements.

Figure 5:
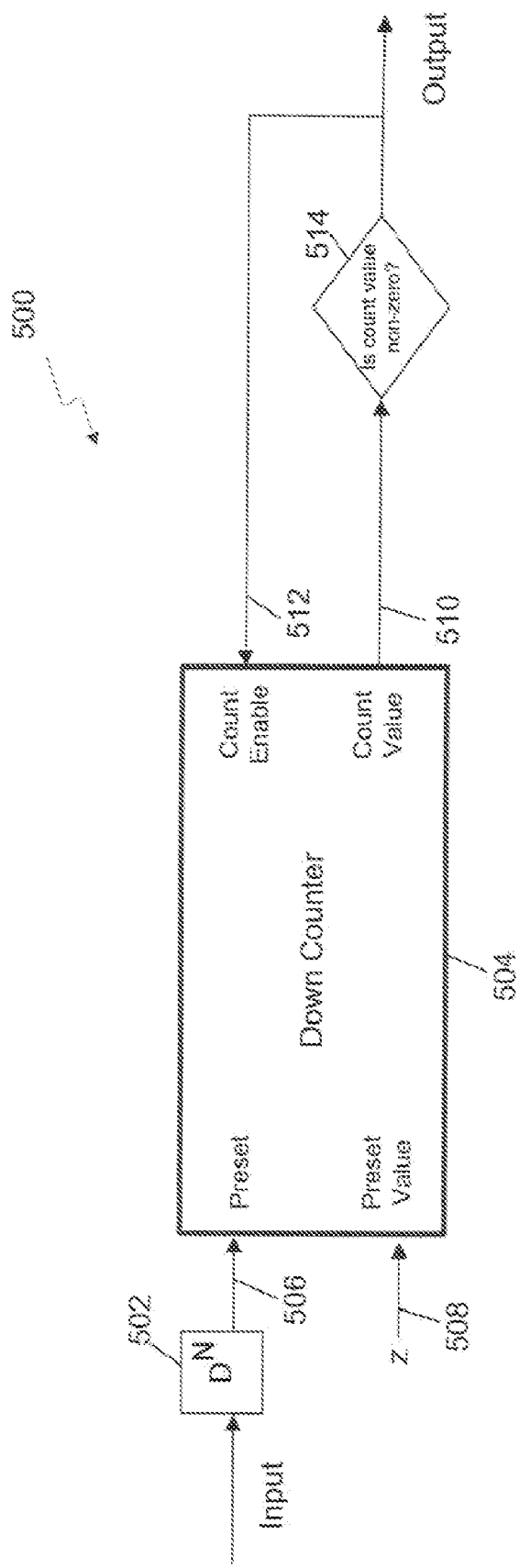
FIG. 5 illustrates an exemplary simplified tracking circuit according to the teachings of the present invention.

The tracking circuit of FIG. 5 may be used if the non-zero filter coefficients of the digital filter are noncontiguous. In this case, the preset value of the down counter 504 is equal to the number of weights from the first non-zero weight to the last non-zero weight. However, the tracking circuit may indicate that some output signals of the digital filter are distorted when they are not.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method of identifying distorted output signals from a digital system caused by at least one distorted input signal to the digital system, comprising:

receiving an input signal having a first input value when a distorted signal is input to the digital system and has a second input value when a non-distorted signal is input to the digital system; and outputting a signal having a first output value to indicate that a corresponding output signal from the digital system is distorted and has a second output value to indicate that a corresponding output signal from the digital system is not distorted.

2. The method of claim 1, wherein the digital system is a digital filter.

3. The method of claim 1, wherein the method operates in parallel with operating the digital system.

4. The method of claim 1, further comprising: modeling delay and widening characteristics of the digital system.

5. The method of claim 4, wherein the digital system provides a digital filter model that models the delay and the widening characteristics of the digital filter.

6. An apparatus that identifies distorted output signals from a digital system caused by at least one distorted input signal to the digital system, comprising:

a tracking circuit that receives an input signal having a first input value when a distorted signal is input to the digital system and has a second input value when a non-distorted signal is input to the digital system, and outputs a signal having a first output value to indicate that a corresponding output signal from the digital system is distorted and has a second output value to indicate that a corresponding output signal from the digital system is not distorted.

7. The apparatus of claim 6, wherein the digital system is a digital filter.

8. The apparatus of claim 6, wherein the tracking circuit operates in parallel with operating the digital system.

9. The apparatus of claim 6, wherein the tracking circuit models delay and widening characteristics of the digital system.

10. The apparatus of claim 9, wherein the digital system provides a digital filter model that models the delay and the widening characteristics of the digital filter.

11. A distorted signal tracking system, comprising:
a digital system; and
a tracking circuit that receives an input signal having a first input value when a distorted signal is input to the digital system and has a second input value when a non-distorted signal is input to the digital system, and outputs a signal having a first output value to indicate that a corresponding output signal from the digital system is distorted and has a second output value to indicate that a corresponding output signal from the digital system is not distorted.

12. The system of claim 11, wherein the digital system is a digital filter.

13. The system of claim 11, wherein the tracking circuit operates in parallel with operation of the digital system.

14. The system of claim 11, wherein the tracking circuit models delay and widening characteristics of the digital system.

15. The system of claim 14, wherein the digital system provides a digital filter model that models the delay and the widening characteristics of the digital filter.

* * * * *